United States Patent [19]
Fuesz

[11] Patent Number: 5,329,754
[45] Date of Patent: Jul. 19, 1994

[54] MACHINE FOR CHOPPING CROP RESIDUE

[76] Inventor: William T. Fuesz, 20526 County Rd. 5, Haxtun, Colo. 80731

[21] Appl. No.: 940,376

[22] Filed: Sep. 3, 1992

[51] Int. Cl.⁵ .................. A01D 34/44; A01D 34/52; A01F 29/06
[52] U.S. Cl. ........................................... 56/504
[58] Field of Search ........................ 56/504, 505

[56] References Cited

U.S. PATENT DOCUMENTS

| | | | |
|---|---|---|---|
| 11,162 | 6/1854 | Johnson | 172/540 |
| 1,054,256 | 2/1913 | Taylor. | |
| 1,341,825 | 6/1920 | Ruebush | 172/540 |
| 1,648,749 | 11/1927 | Udstad et al. . | |
| 2,674,010 | 4/1954 | Bond et al. | 19/12 |
| 2,708,866 | 5/1955 | Shonts | 172/540 |
| 2,845,015 | 7/1958 | Carawan | 97/40 |
| 3,524,308 | 8/1970 | Spry | 56/51 |
| 3,827,219 | 8/1974 | Ackerman | 56/53 |
| 3,830,047 | 8/1974 | Asumendi | 56/53 |
| 3,841,072 | 10/1974 | Hudson | 56/51 |
| 4,051,903 | 10/1977 | van der Lely | 172/47 |
| 4,072,002 | 2/1978 | Heller et al. | 56/53 |
| 4,121,668 | 10/1978 | Miner | 172/42 |
| 4,127,177 | 11/1978 | van der Lely | 172/59 |
| 4,150,724 | 4/1979 | Strobel | 172/328 |
| 4,884,391 | 12/1989 | Cosson | 56/53 |

Primary Examiner—Stephen J. Novosad
Attorney, Agent, or Firm—Timmons & Kelly

[57] ABSTRACT

A plurality of cutting tools are attached to a pair of axles on a frame for chopping crop residue in a direction parallel to the direction of travel. A plurality of transverse knives are attached to the cutting tools for simultaneously chopping the crop residue in a direction perpendicular to the direction of travel. The transverse knives are attached to the circumferential edges of the cutting tools and extend away from the cutting tool edges. The outer edges of the transverse knives are sharp and are angled radially outward from the cutting tools.

10 Claims, 3 Drawing Sheets

MACHINE FOR CHOPPING CROP RESIDUE

BACKGROUND OF THE INVENTION

1. Field of the Invention

This invention relates in general to farm machinery. In particular, the invention relates to machinery for chopping crop residue left after harvesting.

2. Description of the Prior Art

After a crop, such as corn or wheat, has been harvested, a certain amount of crop residue, consisting of corn stalks, wheat stubble, or the like, is left behind. Prudent farming techniques and government regulations require that the crop residue be chopped into small pieces, and that a large amount of the chopped residue be left lying on top of the ground. This action prepares the soil for the next crop and helps to minimize soil erosion and pollution of air and water.

Prior art choppers include rolling choppers for chopping the crop residue in a direction perpendicular to the direction of travel. Other choppers have colters to chop the crop residue in a direction parallel to the direction of travel. The disadvantages to both of these types of machines is that the residue may lie in a particular orientation that causes the residue to be missed by the prior art chopper.

U.S. Pat. No. 4,884,391, issued Dec. 5, 1989, to Cosson, discloses a stalk cutting apparatus that has both a cutter wheel for cutting the stalks perpendicular to the direction of travel, and colters for cutting the stalks parallel to the direction of travel. The cutting wheel is mounted on one axle, and the colters are mounted on several axles located behind the cutting wheel. Thus, as the apparatus is pulled across a field, the crop residue is first chopped perpendicular to the direction of travel, and then parallel to the direction of travel.

SUMMARY OF THE INVENTION

The general object of the method of the invention is to simultaneously chop crop residue in both directions, parallel and perpendicular to the direction of travel. In general, this object is accomplished by a machine having transverse knives attached to cutting tools. Thus, as the cutting tools cut parallel to the direction of travel, the transverse knives simultaneously cut perpendicular to the direction of travel. The crop residue is thus cut to the required size, regardless of the orientation of the residue on the ground.

Another object of the invention is to provide a circular chopping tool having a replaceable chopping edge. This objective is accomplished by a segmented cutting tool, having several segments attached to a central hub. When any single segment is damaged or worn, that segment can be easily replaced, without disturbing the other segments. In fact, the cutting tool segment can be replaced without removing the cutting tool from the axle.

The above, as well as additional objects, features, and advantages of the invention will become apparent in the following detailed description.

DESCRIPTION OF THE PREFERRED EMBODIMENT

Figure 1:
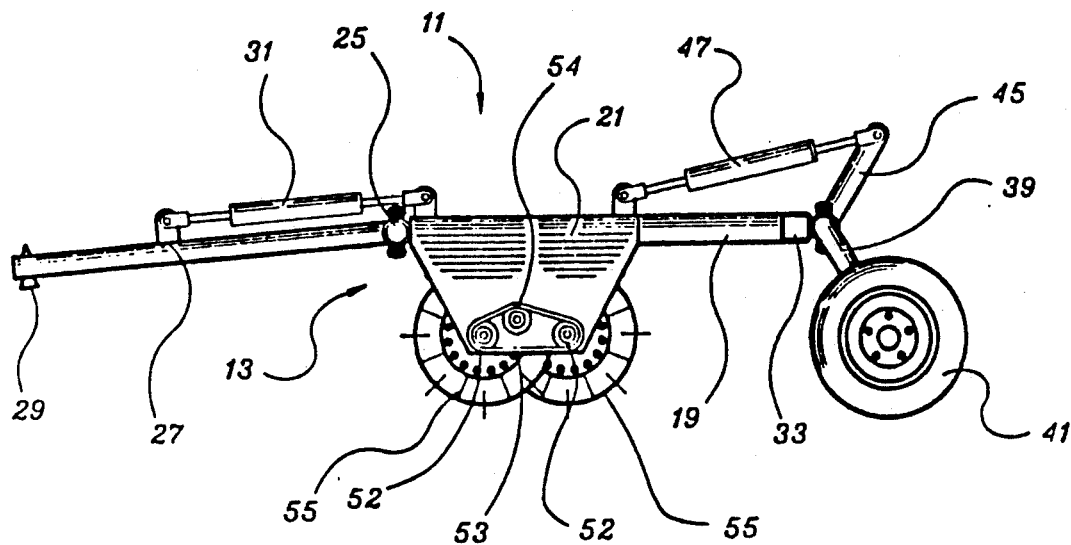
FIG. 1 is a side elevation of a machine for chopping crop residue, according to the invention.
Figure 2:
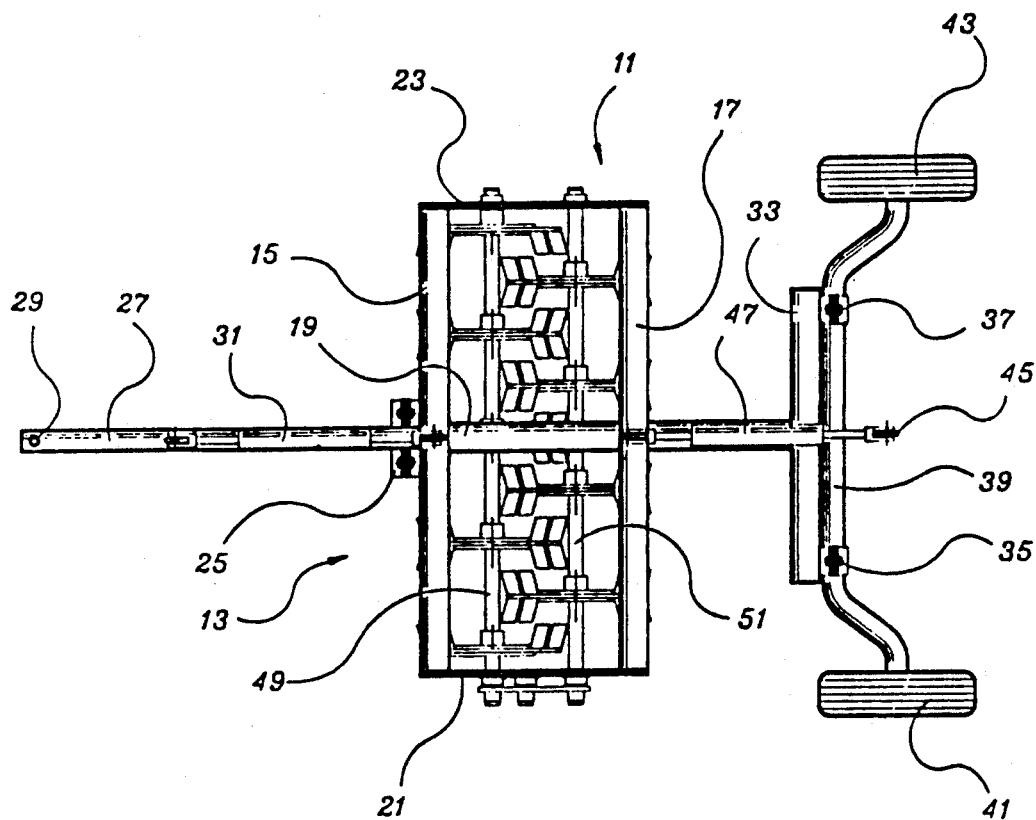
FIG. 2 is a top plan view of the residue chopper shown in FIG. 1.
Figure 3:
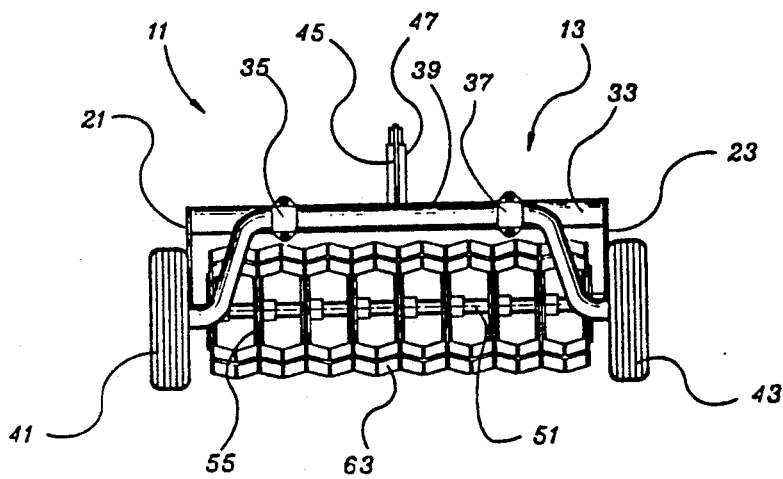
FIG. 3 is a rear elevation of the residue chopper shown in FIG. 1.

The preferred embodiment of the residue chopper 11 of the invention is shown in FIGS. 1-3. The chopper 11 has a steel frame 13, including a forward support beam 15, a rear support beam 17, and a longitudinal support beam 19. The frame 13 also has a left side 21 and a right side 23 that are generally trapezoidal in shape.

A pivot connection 25 attaches a tool bar 27 to the forward support beam 15. A hitch 29 on the front of the tool bar 27 allows the chopper 11 to be attached to a prime mover, such as a tractor, although alternatively the chopper 11 could be self-propelled. A hydraulic cylinder and piston assembly 31 extends between the tool bar 27 and the forward support beam 15, so the height and angle of the frame 13 can be adjusted.

The longitudinal support beam 19 extends rearward past the rear support beam 17 for a distance of several feet. A transverse support beam 33 is connected to the rear end of the longitudinal support beam 19. A pair of pivot connections 35 and 37 connect an axle 39 to the transverse support beam 33, so the axle 39 can be pivoted relative to the transverse support beam 33. A wheel 41 and 43 is connected to each end of the axle 39.

An extension 45 extends upward and rearward from the axle 39, as shown in FIG. 1. A hydraulic cylinder and piston assembly 47 connects the upper end of the extension 45 to the rear support beam 17, so rear end of the longitudinal support beam 19 can be raised and lowered by pivoting the axle 39 relative to the transverse support beam 33.

Two axles 49 and 51 extend between the left side 21 and the right side 23 of the frame 13. Several cutting tools 55 are mounted on each of the axles 49 and 51. The preferred number of cutting tools 55, and the distance between cutting tools 55 are functions of the distance between rows and the desired maximum size of chopped residue. On thirty inch rows, for example, the cutting tools 55 may be spaced fifteen inches apart on each axle 49 and 51, with the cutting tools 55 on one axle 49 alternating with the cutting tools 55 on the other axle 51.

Each axle 49 and 51 extends through the left side 21 of the frame 13. A sprocket wheel 52 is mounted on each axle 49 and 51 and the two sprocket wheels 52 are connected with a timing chain 53. The sprocket wheels 52 and timing chain 53 form a timing mechanism to keep the two axles 49 and 51 synchronized. A tensioning sprocket 54 is mounted on the frame 13 to maintain tension in the timing chain 53.

Figure 4:
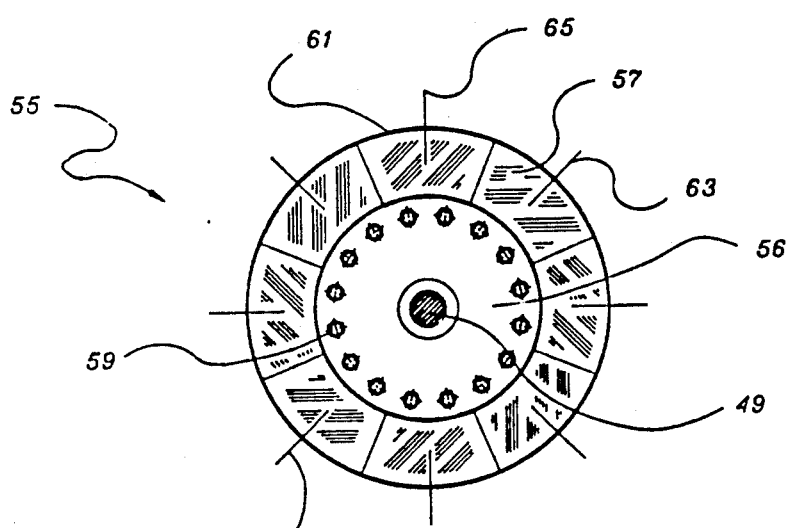
FIG. 4 is a side elevation of a single cutting tool, according to the invention.
Figure 5:
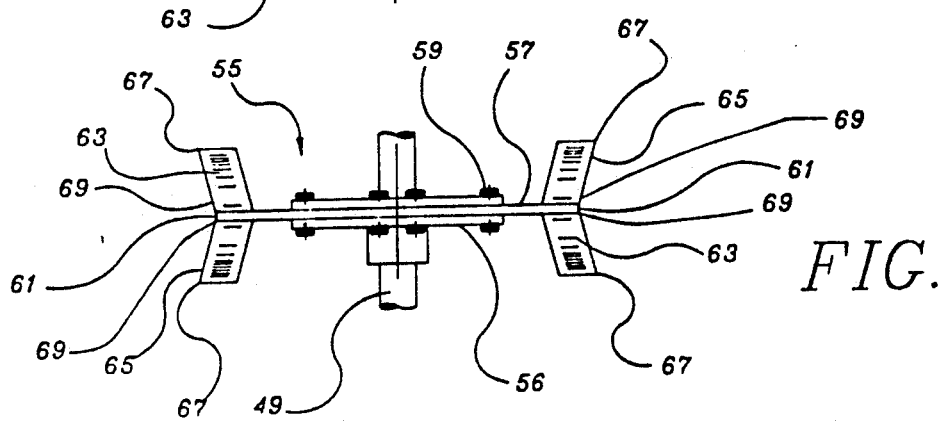
FIG. 5 is a simplified top plan view of the cutting tool shown in FIG. 4.

The individual cutting tools 55 are constructed as shown in detail in FIGS. 4 and 5. Each cutting tool 55 has a circular hub 56 having a diameter of about ten inches. Each hub 56 is actually two circular plates, spaced about three eighths inch apart, as shown in FIG. 5.

Figure 6:
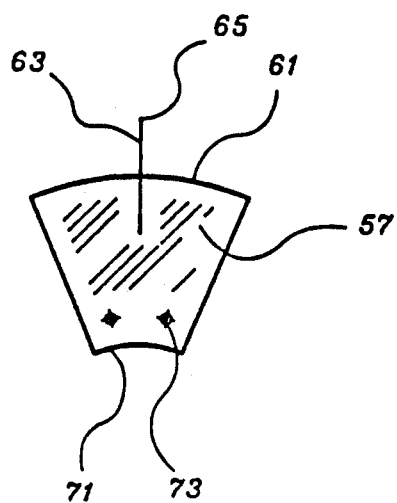
FIG. 6 is a side elevation of a single section of the cutting tool shown in FIG. 4.

Eight cutting tool segments 57 are connected with bolts 59 to the hub 56 and form a complete cutting tool 55 having a diameter of about seventeen inches. A single cutting tool segment 57 is illustrated in FIG. 6. Each cutting tool segment 57 has a sharp outer edge 61, creating a sharp edge around the circumference of the cutting tool 55. This sharp edge 61 cuts in a direction parallel to the direction of travel.

A transverse knife 63 is connected to each of the cutting tool segments 57, as shown in FIGS. 4-6, for a total of eight transverse knives. Each transverse knife 63 has a sharp edge 65 on its radially outward edge. As shown in FIG. 5, the transverse knife 63 extends outward away from the cutting tool 55 and is oriented to cut in a direction perpendicular to the direction of travel. The transverse knife 63 is angled radially outward, so the distal end 67 of the knife 63 is about one inch further away from the axle than the outer edge 61 of the cutting tool 55. Therefore, the total diameter of the cutting tool 55, including the transverse knives 63 is about eighteen inches.

The two outermost cutting tools 55 on the axle 49 may have transverse knives 63 only on one side of the cutting tool 55, as shown in FIGS. 2 and 3. The interior cutting tools 55, however, have transverse knives 63 on both sides, as shown in FIG. 5.

As the transverse knives 63 extend away from the cutting tools 55, the sharp edge 65 is angled forward slightly relative to perpendicular. Thus, the outer end 67 of the knife edge 65 will contact the ground before the inner end 69 of the knife edge 65, thus facilitating the chopping action of the knife edge 65. Alternatively, the edge 65 could be perpendicular or angled backward, rather than forward.

FIG. 6 shows the preferred embodiment of the cutting tool segments 57. The segment 57 is generally trapezoidal in shape, with curved outer edge 61 and a curved inner edge 71. The segment 57 also has a pair of holes 73 for the bolts 59. The transverse knife 63 is a single element, extending from both sides of the cutting tool segment 57.

Figure 7:
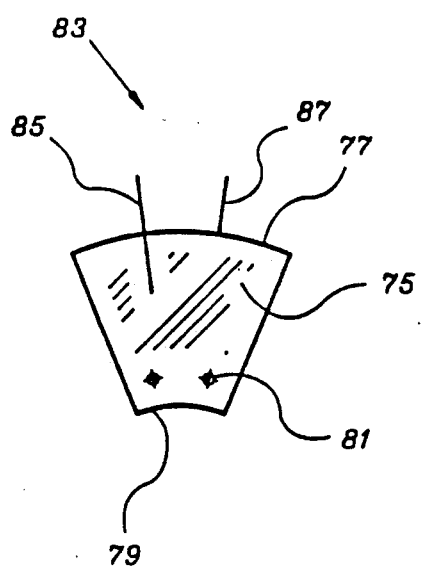
FIG. 7 is a side elevation of an alternate embodiment of the single section of the cutting tool shown in FIG. 6.

FIG. 7 discloses an alternate embodiment of the cutting too segment 75. The alternate segment 75 has a curved, sharp outer edge 77, a curved inner edge 79, and a pair of holes 81 for bolts. The difference is the transverse knife 83, which is split into two halves 85 and 87. The two halves 85 and 87 of the knife 83 are split and are located at different locations along the outer edge 77 of the segment 75.

The chopper 11 of the invention has several advantages over the prior art. Since the cutting tools 55 and the transverse knives 63 chop simultaneously, the chopper 11 does a more complete job of chopping in both directions. The synchronization of the axles causes each knife 63 and each cutting tool 55 to strike the ground at a location that has not been previously struck. Thus, each cutting tool 55 and knife 63 cuts the crop residue against hard ground, rather than soft.

Also, the chopper 11 of the invention is self cleaning, because the spaces between the cutting tools 55 do not plug up. This also allows for a shorter chopper 11 from front to rear, as fewer axles 49 and 51 are necessary. Further, if a single cutting tool segment 57 is damaged or dulled, the segment 57 can be easily replaced without removing the entire cutting tool 55 from the axle 49 or 51.

The invention has been described in only one embodiment. It should be apparent to those skilled in the art that the invention is not so limited, but is susceptible to various changes and modifications without departing from the spirit of the invention.

I claim:

1. A machine for chopping crop residue, comprising:
    a frame having a forward direction of travel;
    a cutting tool, having a circumferential sharp edge, and attached to the frame in a direction parallel to the direction of travel for chopping crop residue in a direction parallel to the direction of travel, wherein the cutting tool further comprises a hub having a pair of spaced apart circular plates attached to the frame, and a plurality of removable cutting tool segments attached to the hub between the circular plates; and
    a transverse knife attached to the cutting tool transversely to the direction of travel for chopping crop residue in a direction perpendicular to the direction of travel.

2. A machine as recited in claim 1, wherein the transverse knife extends away from the circumferential edge of the cutting tool and the transverse knife is perpendicular to the cutting tool.

3. A machine as recited in claim 1, further comprising:
    a plurality of additional cutting tools attached to the frame; and
    a plurality of additional transverse knives attached to the cutting tools.

4. A machine as recited in claim 3, wherein each cutting tool has eight transverse knives, the blades on each cutting tool being evenly spaced around the circumference of the cutting tool.

5. A machine for chopping crop residue, comprising:
    a frame having a forward direction of travel;
    a plurality of cutting tools, each having a circumferential sharp edge, and attached to the frame in a direction parallel to the direction of travel for chopping crop residue in a direction parallel to the direction of travel; and
    a plurality of transverse knives attached to the cutting tool transversely to the direction of travel for chopping crop residue in a direction perpendicular to the direction of travel, wherein each transverse knife has a sharp edge extending away from the cutting cool, and as the edge extends away from the cutting tool, the edge of each transverse knife is angled radially relative to the edge of the cutting tool.

6. A machine as recited in claim 5, wherein the edge of each transverse knife is angled radially outward as the edge extends away from the cutting tool.

7. A machine for chopping crop residue, comprising:
    a frame having a forward direction of travel;
    a pair of axles attached to the frame;
    a plurality of cutting tools, each having a circumferential sharp edge, and attached to one of the axles in a direction parallel to the direction of travel for chopping crop residue in a direction parallel to the direction of travel;
    a plurality of transverse knives attached to the cutting tools transversely to the direction of travel for chopping crop residue in a direction perpendicular to the direction of travel; and
    a timing chain attached to the two axles for causing the axles to rotate at the same rate.

8. A machine as recited in claim 7, wherein each cutting tool further comprises:

a hub attached to the frame;

a plurality of removable cutting tool segments attached to the hub.

9. A machine as recited in claim 8, wherein each cutting tool segment has a sharp outer edge, and the sharp outer edges of the cutting tool segments form the circumferential sharp edge of the cutting tool.

10. A machine as recited in claim 8, wherein each cutting tool segment is bolted to the hub.

* * * * *